(12) United States Patent
Anderton et al.

(10) Patent No.: US 7,443,560 B2
(45) Date of Patent: Oct. 28, 2008

(54) SCANNING IMAGING APPARATUS

(75) Inventors: Rupert N Anderton, Malvern (GB); Peter R Coward, Malvern (GB)

(73) Assignee: QinetiQ Limited, London (GB)

( * ) Notice: Subject to any disclaimer, the term of this patent is extended or adjusted under 35 U.S.C. 154(b) by 13 days.

(21) Appl. No.: 11/665,540

(22) PCT Filed: Oct. 14, 2005

(86) PCT No.: PCT/GB2005/003942

§ 371 (c)(1),
(2), (4) Date: Apr. 17, 2007

(87) PCT Pub. No.: WO2006/043032

PCT Pub. Date: Apr. 27, 2006

(65) Prior Publication Data
US 2008/0030822 A1 Feb. 7, 2008

(30) Foreign Application Priority Data
Oct. 23, 2004 (GB) .................................. 0423595.8

(51) Int. Cl.
*G02B 26/08* (2006.01)
(52) U.S. Cl. ........................ 359/212; 359/205; 359/208; 359/226
(58) Field of Classification Search .................. None
See application file for complete search history.

(56) References Cited

U.S. PATENT DOCUMENTS

| | | | |
|---|---|---|---|
| 3,235,733 A | 2/1966 | Dauguet | |
| 3,782,835 A | 1/1974 | Abel | |
| 4,274,098 A | 6/1981 | Renau et al. | |
| 4,599,623 A | 7/1986 | Havkin et al. | |
| 5,162,803 A | 11/1992 | Chen et al. | |
| 5,640,283 A * | 6/1997 | Warren | 359/859 |
| 6,587,246 B1 | 7/2003 | Anderton et al. | |

FOREIGN PATENT DOCUMENTS

| WO | 00/14587 | 3/2000 |
|---|---|---|
| WO | 02/066998 | 8/2002 |

OTHER PUBLICATIONS

International Search Report for PCT/GB2005/003942 mailed Nov. 30, 2005.
UK Search Report for GB 0423595.8, date of search: Mar. 17, 2005.
Appleby et al., *Compact real-time (video rate) passive millimetre-wave imager*, Proceedings of the SPIE, vol. 3703, Apr. 1, 1999, pp. 13-19, XP002289764.

* cited by examiner

*Primary Examiner*—James Phan
(74) *Attorney, Agent, or Firm*—Nixon & Vanderhye

(57) ABSTRACT

A scanning imaging apparatus comprises an optical system including a curved polariser/reflector, a rotatable reflector, a polarisation twisting plate, and a receiver array, wherein a convex reflective element is incorporated in the optical path that acts as a sub-reflector that increases the optical system focal length. It has been found that an increase to the optical focal length in this manner gives a greater 3 dB spot size at the image plane, thus easing design constraints on the receiver array packing density, whilst maintaining a given spatial sampling interval. An additional benefit is that radiation from differing scan locations diverges as it approaches the image plane, which provides more volume in which to position receiver electronics. Focussing of the optical system may be achieved by movement of the sub-reflector.

6 Claims, 3 Drawing Sheets

SCANNING IMAGING APPARATUS

This application is the U.S. national phase of international application PCT/GB2005/003942 filed 14 Oct. 2005, which designated the U.S. and claims benefit of GB 0423595.8 filed 23 Oct. 2004, the entire contents of each of which are hereby incorporated by reference.

BACKGROUND OF THE INVENTION

1. Field of the Invention

This invention relates to scanning apparatus which may be used in a real-time imaging system, and has particular utility in a real-time passive millimetre wave imaging system, as well as at other wavelengths. The scanning imaging apparatus may also be used in other radiometry systems.

2. Description of Prior Art

Imaging using electromagnetic radiation at millimetre wavelengths, or thereabouts, is potentially useful as an all-weather surveillance and guidance aid and for indoor and outdoor security applications, but any practically useful system must be capable of imaging in real-time. This was until recently a problem due to the high number of very expensive receivers required that are able to operate at the frequencies of interest.

Imagers that operate at millimetre wavelengths or thereabouts often use a concave mirror or a lens to focus radiation from the scene being imaged onto an array of receivers. At present, large two-dimensional arrays of receivers which cover the whole of a required image are not available. Instead, a far smaller number of receivers is scanned across the image in order to build up the complete picture.

Current millimetre wave imaging systems use mechanical scanning of one or several channels to synthesise an image. Ultimately, electronic scanning and staring array techniques could be developed to implement real-time millimetre wave imaging, although there are several problems associated with such a solution. Firstly, as the wavelength is necessarily long, in order to image under adverse weather conditions the system aperture must be large to gain adequate resolution. In some millimetre wave imaging systems the input aperture may be of the order of 1 m in diameter. Secondly, the cost per channel is high so that any electronically scanned or staring array technique is likely to be prohibitively expensive. Furthermore, in the case of millimetre wave staring arrays there are fundamental problems analogous to the cold shielding problems encountered in infrared systems.

Another requirement of a practical millimetre wave imaging system is that it should ideally be able to operate at TV-compatible rates (i.e. 50 Hz for the UK, 60 Hz for the USA). In the infrared, scanning systems are often plane mirrors flapping about an axis contained within their surface. This is not a practical option in the millimetre waveband as large aperture mirrors would be required to flap back and forth at TV-compatible rates, requiring a large acceleration, and thus force at the end of each scan, and would therefore require a very large and complex mechanical arrangement.

In infrared imaging systems, where input apertures are typically only 10 mm in diameter, rotary systems have been used (EP 0226273). Furthermore, in the infrared, it is usual to employ a focal telescopes to match the field of view in the scene to that of a rotating polygon scanning means. This is impractical in high resolution millimetre wave imaging where the input apertures have considerably greater diameters and a focal telescopes would need to be excessively large.

Any scanning mechanism used in a millimetre wave imaging system must therefore be situated in either the object or the image plane. Furthermore, any scanning mechanism situated in the image plane must have good off-axis performance. This is difficult to achieve using existing technology.

Another known scanning method used in infrared imagers is a system of two discs rotating about axes which are slightly inclined to the normals to their faces (U.S. Pat. No. 4,923,263). Radiation incident on the first disc is reflected at oblique incidence from the first rotating disc and passes to the second disc to experience a second reflection. By varying the orientation and relative speed of rotation of the discs, varying scan patterns can be achieved. Such a two-axis rotating disc system would not be ideal for use in imagers operating at or around millimetre wavelengths, however, as the system would be inconveniently large.

Applicant's International patent No. WO2002/066998—the whole contents of which are hereby included by reference, discloses a scanning imaging system that operates on the principle of scanning a solid angle to be imaged past a relatively small number of sensors, this scanning being performed at a sufficient rate so as to produce a real-time video image of the scanned volume. The disclosure provides a means for generating a compact mechanically scanned system. This consists of a polarising grid reflector, a image plane of receivers in a linear array, a polarisation twisting quarter-wave plate or ferrite and a rotating tilted mirror. Radiation from the scene is transmitted through the grid, and reflected from the mirror—the rotation of which conically scans the beam—and then arrives back at the grid with an orthogonal polarisation to that which was incident on the imager. This radiation is then reflected by the grid and focussed onto the receiver array. The grid and mirror typically have aspheric shapes to correct for optical aberrations.

Because of the long wavelength as compared to optical systems, imagers such as that disclosed in WO2002/066998 are generally required to have large apertures to achieve a useful angular resolution. An aperture of around 1 m might be typical. To make such an imager deployable it must be as compact as possible for its aperture which has hitherto required a 'fast' optical system, with the focal length/aperture ratio typically around 0.5 (i.e. the f/number is f/0.5). This gives a system of relatively short overall length and minimises any overdimensioning (compared to the aperture) of the grid. Systems faster than f/0.5 are usually too hard to correct for the typical fields of view required.

To avoid producing imagery with gaps, the image plane should be sampled at least once per 3 dB spot size in the direction of the receiver array, and to avoid losing any information it is preferable that the image plane is sampled twice per 3 dB spot size (the Nyquist rate). This puts demands on the maximum size of the receiver array in the image plane, particularly when the desired wavelengths of operation are reduced. The receiver array is made up from a plurality of receiver elements, each of which comprises a receive antenna coupled to receive electronics. The receive antennas of the receive elements need to be positioned on the image plane so as to be in the optimal reception position, and so the sampling criteria described above puts a maximum value on the spatial separation of the receive element antennas in a given system.

This problem can be overcome to some extent by using a two-dimensional array of receivers, where the rows of receivers may be staggered, as described in WO2002/066998, and more particularly on pages 6-8 of that publication, but it is still difficult to sample an image well throughout the field of view and larger numbers of receivers are required than would be the case if a linear array were possible.

SUMMARY OF THE INVENTION

It is an object of the present invention to provide a compact object space scanning apparatus which may be used, in particular, to implement real-time imaging at millimetre wavebands or thereabouts, or in radar systems. It is also an object of the invention to provide a scanning apparatus which has limited power requirements, no out-of-balance forces and gives good off axis performance.

According to the present invention there is provided a scanning imaging apparatus operable at millimetre wavelengths or thereabouts comprising an optical system, a plurality of receiver elements together forming a receiver array, a processor and a display means, wherein the optical system comprises:

a curved polariser/reflector that allows radiation of a first polarisation to pass through, and reflects radiation having a polarisation orthogonal to the first polarisation;

a rotatable reflective plate, the reflective plate having an axis of rotation, wherein the axis of rotation is inclined at a non-zero angle $\theta_a$ to both the reflective plate and the normal to the reflective plate at the centre of rotation, and arranged to reflect radiation onto the polariser/reflector plate;

a polarisation rotation plate located between the curved polariser/reflector and the rotatable reflective plate, adapted to perform the action of either: transforming incident linearly polarised radiation to circular polarisation, and vice versa, or to non-reciprocally rotate the plane of polarisation of any radiation passing through by 45 degrees;

characterised in that the optical system further includes a convex sub-reflector that acts in combination with the curved polariser/reflector to bring radiation to a focus at an image plan e, the sub-reflector providing an increased system focal length.

Increasing the focal length of the focussing means according to the present invention would be a strategy not normally contemplated by those working in the relevant field of technology, due to the increase in system length that usually accompanies such a move. The physical size of imagers working at millimetre wavebands or thereabouts is currently an issue amongst users of such systems. There is a general desire to reduce the size where possible, and a definite prejudice against making the systems larger. Increasing the focal length therefore would be considered counter intuitive if there is no desire to make the imager significantly larger.

However, it has been found that increasing the focal length has significant advantages over the prior art imager. The use of a longer focal length increases the permissible spacing of the receiver elements' antennas on the image plane whilst still maintaining sufficient spatial sampling of the image plane to ensure continuous coverage of a scene to be imaged.

The invention employs a convex sub-reflector in the optical path of the radiation that provides the increased focal length. This effectively converts the optical system of the prior art WO2002/066998 from a modified Schmidt system to a modified Schmidt-Cassegrain system. This has a further benefit over the prior art in that the image p lane may have a curvature in the opposite manner to that of the prior art. Indeed, in some embodiments the system image plane is concave in profile. The divergent nature of normals projected from the concave image plane to a region behind it thus means that there will be more space behind each antenna element sitting on the image plane to accommodate the electronics associated with each antenna.

The convex sub-reflector focussing element may preferably be arranged to be moveable with respect to the other focussing elements, so allowing a convenient means for changing the focus of the system. This allows a significant advantage over the prior art, where to focus the system requires the whole of the receiver array to be moved, leading to complications with mounting and cabling.

The polarisation rotation plate is a known optical device. It may comprise a quarter-wave plate, such as a meanderline, or may comprise a component able to non-reciprocally rotate the plane of polarisation of radiation passing therethrough by 45°, such that radiation reflecting from a mirror and passing back through the component in the opposite direction is rotated a further 45°, so giving a total twist of 90°.

Note that in this specification the use of the term "optical" does not mean or imply that the system is operational at visible wavelengths. The term is used in the sense that analysis techniques commonly employed at visible wavelengths may also be applied to the current system, even though the wavelengths of operation are quite different. Also, the techniques presented herein are applicable across the millimetre waveband, and will also be applicable at sub-millimetre wavebands, e.g. up into terahertz frequencies.

BRIEF DESCRIPTION OF THE DRAWINGS

The present invention will now be described in more detail, by way of example only, with reference to the following Figures, of which.

DETAILED DESCRIPTION OF PREFERRED EMBODIMENTS

Figure 1:
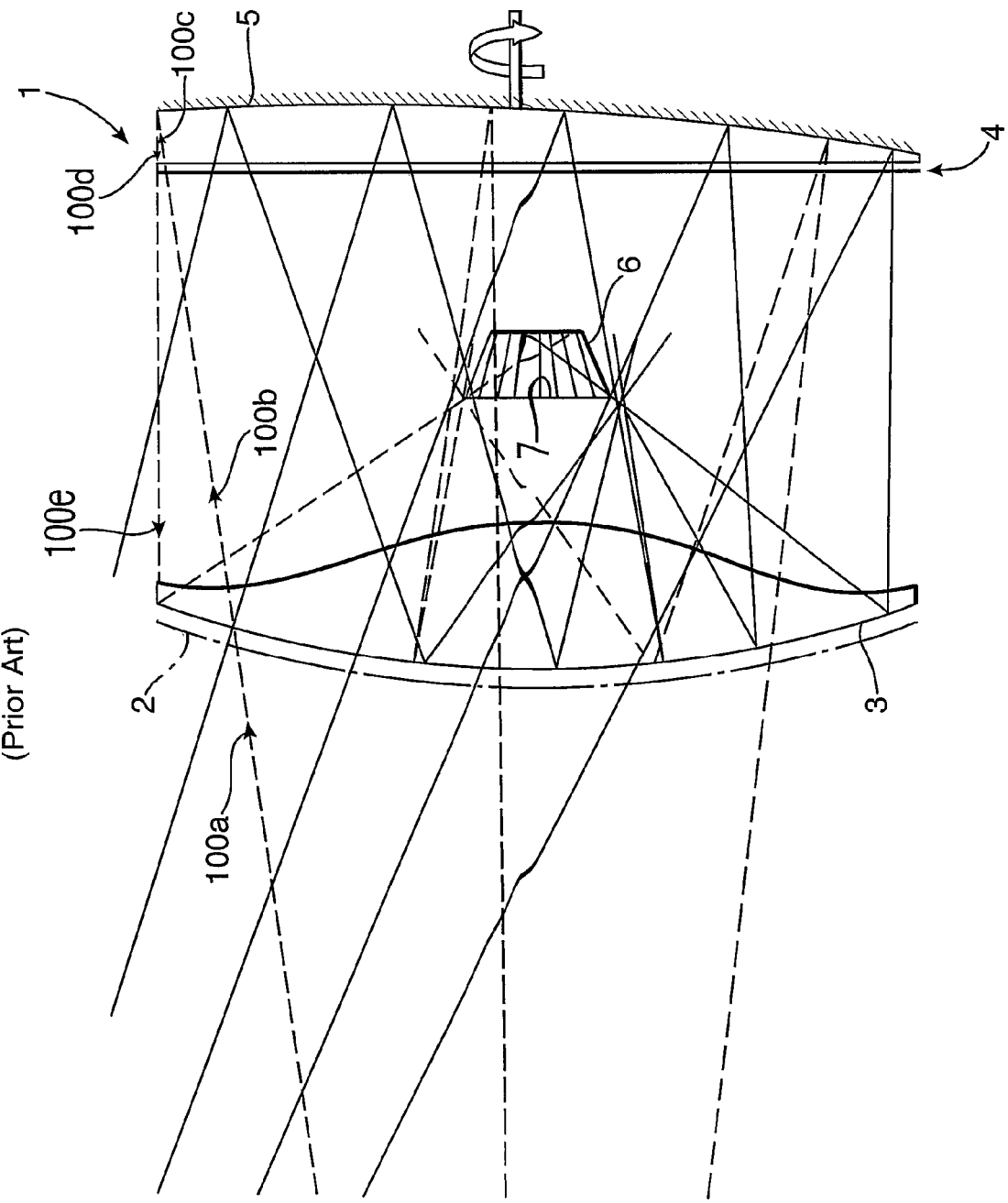
FIG. 1 diagrammatically illustrates a scanning imager of the prior art.

Shown in FIG. 1 is a scanning imager of the prior art, of the type described in Applicant's co-pending patent application PCT/2004/002520. This shows an imager 1 incorporating a curved polariser/reflector 2 which allows radiation 100a of a specific polarisation 100b to pass therethrough whilst reflecting radiation of orthogonal polarisation. This curved polariser/reflector 2 may also contain a dielectric material 3 acting as both a physical support and a lens that may be used to help correct system aberrations.

The next component in the optical path is a quarter-wave plate 4, followed by a curved rotatable reflector 5. Linearly polarised radiation 100b passes through the quarter wave plate 4 and hence becomes circularly polarised 100c. It then gets reflected from the rotatable reflector 5, where the polarisation changes handedness 100d, and passes again through the quarter-wave plate 4 which converts the radiation to linearly polarised radiation 100e of an orthogonal direction to radiation 100b and from there back to the curved polarising grid 2, which, due to the polarisation change in the radiation from the previous components now acts as a reflector. An array of receiver elements 6 arranged on the system image plane 7 collects and processes any received radiation. The main focusing power is split between the rotatable reflector 5 and the curved polariser/reflector 2, although it is possible to use the curvature of just one of these elements to implement the focussing. Either or both of the rotable reflector 5 and the polariser/reflector 2 may have an aspheric curvature, to help correct optical aberrations.

The rotatable reflector 5 is mounted with its axis at a small non-zero angle to the axis of rotation. As it rotates it has the effect of scanning radiation from different angular directions on to the receive elements. The focussing effect of the curved polariser 2, when acting as a reflector, provides the main focussing power in the system, and brings the received energy to a focus at the image plane. If it is required to receive energy from different ranges, then the position of the image plane 7 will be dependent upon this range. To enable the system to be able to focus on these different ranges the receiver array 6 is arranged to be moveable across the varying image plane position. This adjustment requires a relatively complex mechanical arrangement to allow the receiver array to be moved, whilst keeping power and signal lines connected to the receiver array.

A further problem with this arrangement can be seen by examining how the radiation approaches the receiver array 6 from the curved polariser/reflector 2. Radiation from different parts of scene is converging at the point it reaches the image plane. If receive antennas on the receivers 6 are mounted optimally then the space behind the receive antennas becomes more limited, so compromising the volume available for electronic circuits within the receivers.

It is reasonably straightforward to produce an imager wherein the optical system is diffraction limited, and the imager of FIG. 1 is of this type. For a diffraction limited system the 3 dB spot size in the image plane is approximately $1.22\lambda(f/D)$ where $\lambda$ is the wavelength and f/D is the f/number, so at an operational frequency of 90 GHz the 3 dB spot size in the image plane for an f/0.5 system is approximately 2.03 mm. Current technology is unable to produce 90 GHz band receivers in a package smaller than 5 mm in the plane of the array, and so a one-dimensional linear array is unable to sample the image plane at a preferred sampling rate for optimal image production. It has proved to be a problem with current technology to get a receiver spacing at anything less than 5 mm at 90 GHz.

Figure 2:
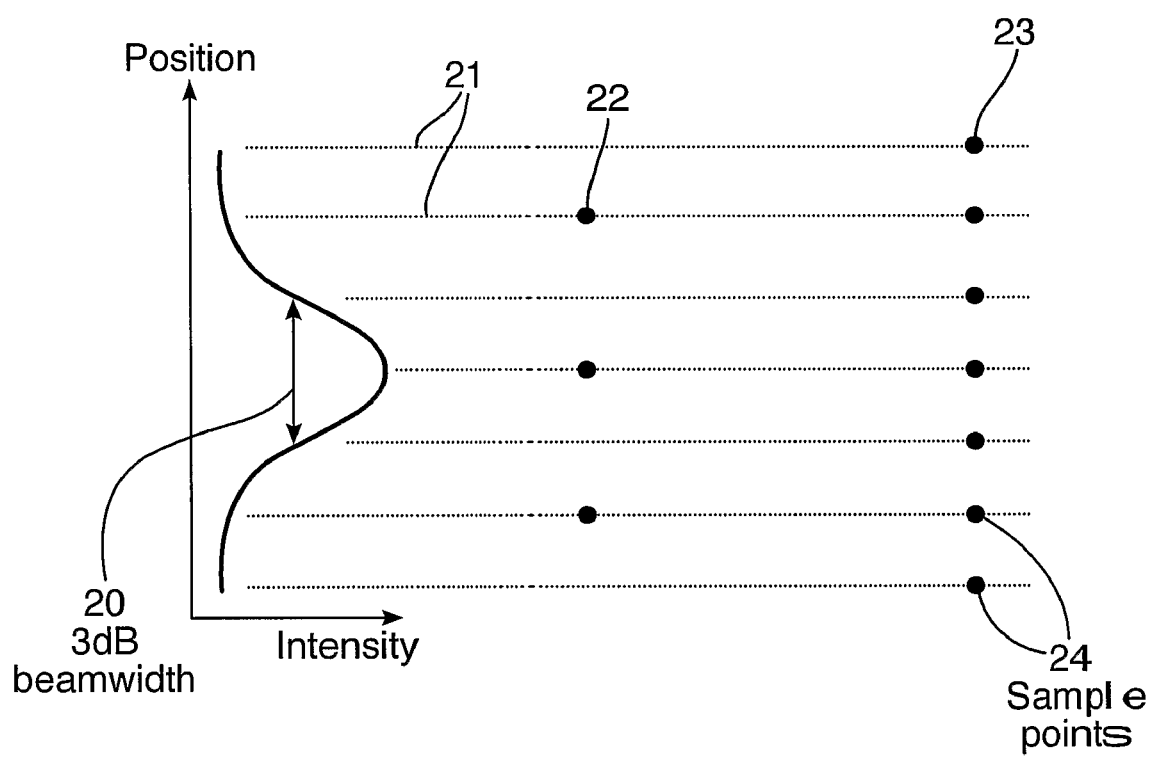
FIG. 2 shows spatial sampling criteria for both Rayleigh and Nyquist sampling.
Figure 3:
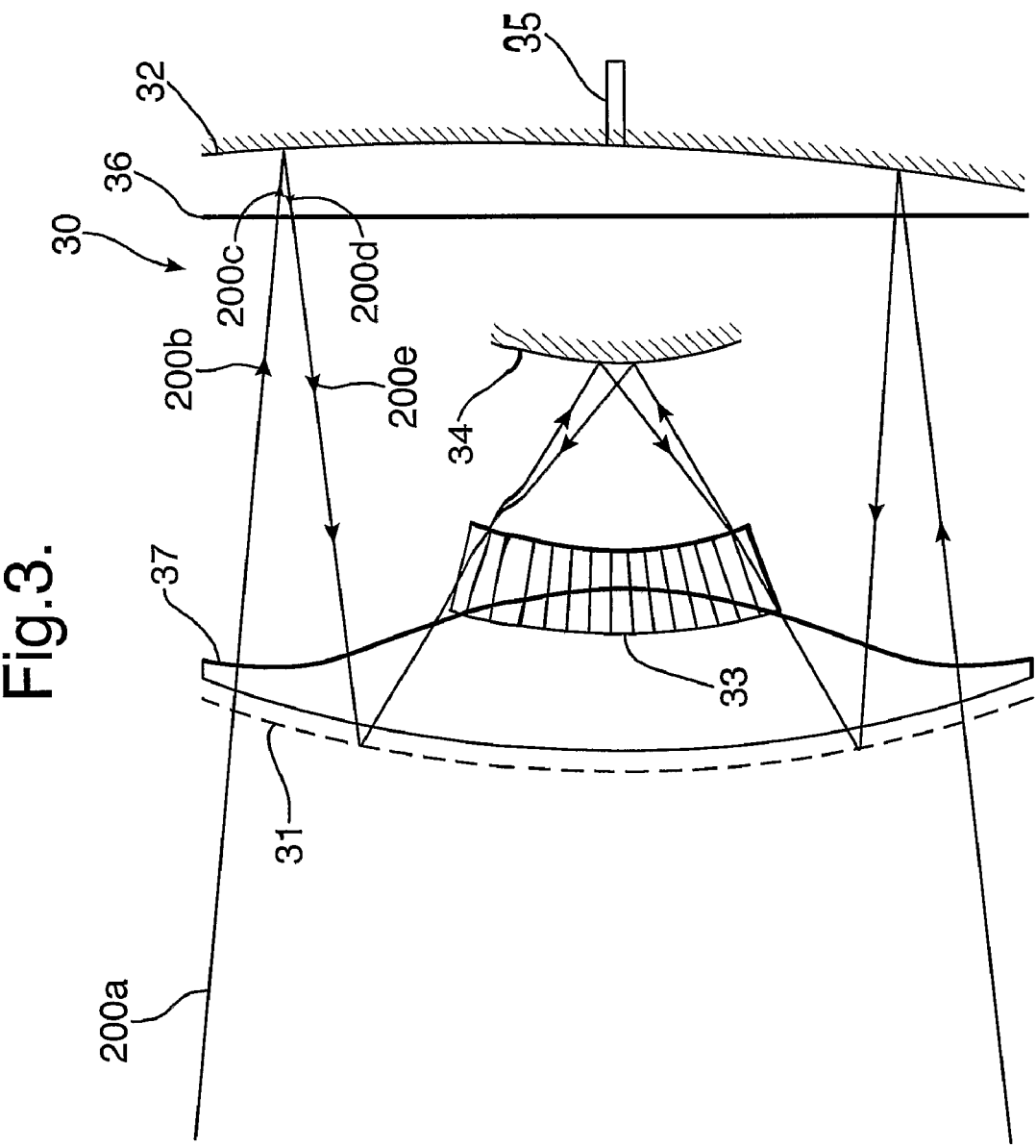
FIG. 3 diagrammatically illustrates an embodiment of the present invention.

FIG. 2 shows a graph of a simplified point spread function for an imager operable at millimetre wavelengths or thereabouts. The graph has spatial linear position on the vertical axis, and intensity on the horizontal axis. The intensity curve has a peak in intensity at a mid position, that decays as the spatial observation point moves away from it. A half power, or 3 dB beamwidth 20 is indicated, and is equivalent to the distance between alternate dotted lines 21. Sampling at the equivalent of once per 3 dB beamwidth 20 is indicated by the spatial sampling points 24 in the centre 22 of the graph. This is Rayleigh sampling. Shown on the right are sample points 23 consistent with Nyquist sampling, where two samples are taken per 3 dB beamwidth. The performance of the imager when sampled using the Rayleigh criteria is adequate for some purposes, but when Nyquist sampling is used a significant improvement in image quality is obtained. Clearly, the closer an imager can operate to the Nyquist spatial sampling rate, the better a resultant imager will be. This is difficult for the reasons presented above FIG. 3 shows an embodiment of the current invention. A 94 GHz real time passive scanning imaging apparatus 30 has a curved polariser/reflector 31, a rotatable reflector 32 between which is a quarter wave plate 36, and receiver array 33, wherein outputs from the receiver array are fed to a microprocessor and an image display (not shown). These elements operate largely similarly to those of the prior art. A dielectric material 37 is positioned behind the curved polariser/reflector 31 to provide mechanical support for it. The rear surface of the dielectric material 37 may advantageously be shaped such that it acts as a dielectric lens. This lens, along with any other focussing element in the system may be designed so as to correct optical aberrations, as is done in the prior art of FIG. 1. Typically this will involve adding an aspheric curvature to a surface of the elements. The optical system additionally comprises a convex sub-reflector 34 for increasing the focal length of the lens assembly. The subreflector 34 may also have an aspheric curvature, to help correct optical aberrations.

The rotatable reflector 32 comprises a flat or slightly curved reflector plate rotatably mounted about an axis 35, and inclined at an angle $\theta$ (say about 5°) to the normal to the axis.

Incident radiation 200a is linearly polarised by the polariser/reflector 31, which may have wires inclined at 90° to the vertical (say) so that the component of radiation 200b with a plane of polarisation 0° to the vertical (90° from the line of the wires in the polariser/reflector) is transmitted through the wire grid. Most of this linearly polarised radiation encounters the quarter-wave plate 36 (typically a meanderline). The meanderline plate 36 has fast and slow axes of the meanderlines inclined at 45° to the direction of the wires on the grid. Radiation 200c, emerging from the meanderline plate 36 is circularly polarised and is reflected from reflector plate as radiation 200d, which is circularly polarised in the opposite sense to the incoming radiation 200c on the reflector plate 32. When the radiation 200d then encounters again the meanderline plate 36 it is converted back to linearly polarised radiation 200e, which has its plane of polarisation rotated by 90° in comparison with radiation 200b. When radiation 5e encounters the polariser/reflector plate it is reflected onto the convex sub-reflector 34, from where it is focused onto the receiver array 33. Except for the addition of the sub-reflector 34 the optical system is largely similar to the prior art shown in FIG. 1 in terms of the operation of the polarising elements.

Each receiver comprises of a receive horn connected to an amplifier. Radiation entering each horn will pass to the amplifier. The amplifier provides an output to a detector (e.g. a Schottky detector). The microprocessor receives signals from the detector and processes these signals to produce an image which is displayed on the display.

Some of the radiation 200b passing initially through the polariser/reflector 31 will be incident upon the sub-reflector 34, where it will be directly reflected towards the receiver array, but, having the incorrect polarisation for the receiver array 33, will not be detected.

A beneficial effect of the use of the convex sub-reflector 34 is to increase the system focal length, f. As the overall diameter D of the system remains the same, the f/number also increases. The result of this is that the 3 dB spot in the image plane for the current invention is increased due to the increase in focal length, and consequent increase in the system f/number means that there is a greater spacing between adjacent receivers in the receiver array.

The embodiment shown in FIG. 3 has a 3 dB spot size of 8.2 mm, which enables the spatial sampling of the receivers to be much improved over the prior art when adjacent receivers are centred 5 mm from each other, although this embodiment does still fall short of allowing sampling at the Nyquist rate with receiver centres separated by 5 mm. The embodiment has a nominal range of 8.5 m, and has an overall length of 0.734 m, and a diameter of 1 m. The arrangement of reflectors 31, 32, 34 and lens 37 is designed to present an effective focal length of 2021 mm when the system is focused at the nominal range, giving an f/number of f/2.02.

The image plane is 410 mm long, and so at a 5 mm separation 82 receivers are required to sample at the rate discussed above.

A further benefit is that focussing is achieved by movement of the sub-reflector 34, rather than by movement of the receiver array itself as is done in the prior art. Moving the sub-reflector 34 towards the polariser/reflector 31 by 52 mm will focus the system on infinity, and moving it 32 mm towards the rotatable reflector 32 will focus the system to a 5 m range.

A further benefit is that the sub-reflector 34 causes radiation reflected therefrom from different scan locations to be divergent as it approaches the image plane. Thus the antenna horns of each of the receivers in the receiver array may be optimally positioned so as to form a concave arrangement, which means that the rear parts of each receiver also diverges from the adjacent receiver. This allows more lateral space in which to fit the electronics of each receiver element, leading to a more compact design for the receiver array.

The sub-reflector 34 is elliptical in shape, when seen from the front, with a long axis of 360 mm length, and a short axis of 220 mm. One minor disadvantage of the present invention is the obscuration caused by the presence of the sub-reflector. The obscuration however in this embodiment however is approximately 9%, and so is within acceptable limits.

The embodiment shown in FIG. 3 has an array of receivers arranged with each receiver's antenna being on the image plane of the imager. Each receiver has a depth extending from the image plane towards the polariser/reflector. This depth impinges on the dielectric material used to provide mechanical support and additional focussing to the polariser/reflector. This is not a significant problem however, as some of the dielectric material may be removed so as to provide room for the receivers without significant detriment to the optical system. This is because the region in which dielectric material is removed is associated with that part of the optical system that is anyway blocked by the receivers and sub-reflector, therefore no further detriment is caused.

The invention has utility in both indoor and outdoor applications, and in static and mobile operations.

The skilled person will be aware that other embodiments within the scope of the invention may be envisaged, and thus the invention should not be limited to the embodiments as herein described.

The invention claimed is:

1. A scanning imaging apparatus operable at millimetre wavelengths or thereabouts comprising an optical system, a plurality of receiver elements together forming a receiver array, a processor and a display means, wherein the optical system comprises:
   a curved polariser/reflector that allows radiation of a first polarisation to pass through, and reflects radiation having a polarisation orthogonal to the first polarisation;
   a rotatable reflective plate, the reflective plate having an axis of rotation, wherein the axis of rotation is inclined at a non-zero angle $\theta_a$ to both the reflective plate and the normal to the reflective plate at the centre of rotation, and arranged to reflect radiation onto the polariser/reflector plate;
   a polarisation rotation plate located between the curved polariser/reflector and the rotatable reflective plate, adapted to perform the action of either: transforming incident linearly polarised radiation to circular polarisation, and vice versa, or to non-reciprocally rotate the plane of polarisation of any radiation passing through by 45 degrees;
   characterised in that the optical system further includes a convex sub-reflector that acts in combination with the curved polariser/reflector to bring radiation to a focus at an image plane, the sub-reflector providing an increased system focal length.

2. An imaging apparatus as claimed in claim 1 wherein a refractive lens element is incorporated between the polariser reflector plate and the convex sub-reflector.

3. An imaging apparatus as claimed in claim 1 wherein a refractive lens element is incorporated between the sub-reflector and the receiver elements.

4. An imaging apparatus as claimed in claim 1 wherein the sub-reflector is arranged to be moveable with respect to the curved polariser/reflector to facilitate focussing of the optical system.

5. An imaging apparatus as claimed in claim 1 wherein the rotatable reflector plate has a curvature that cooperates with the polariser/reflector and the sub-reflector to focus incoming radiation onto the image plane.

6. An imaging apparatus as claimed in claim 1 wherein the image plane is concave.

* * * * *